UNITED STATES PATENT OFFICE.

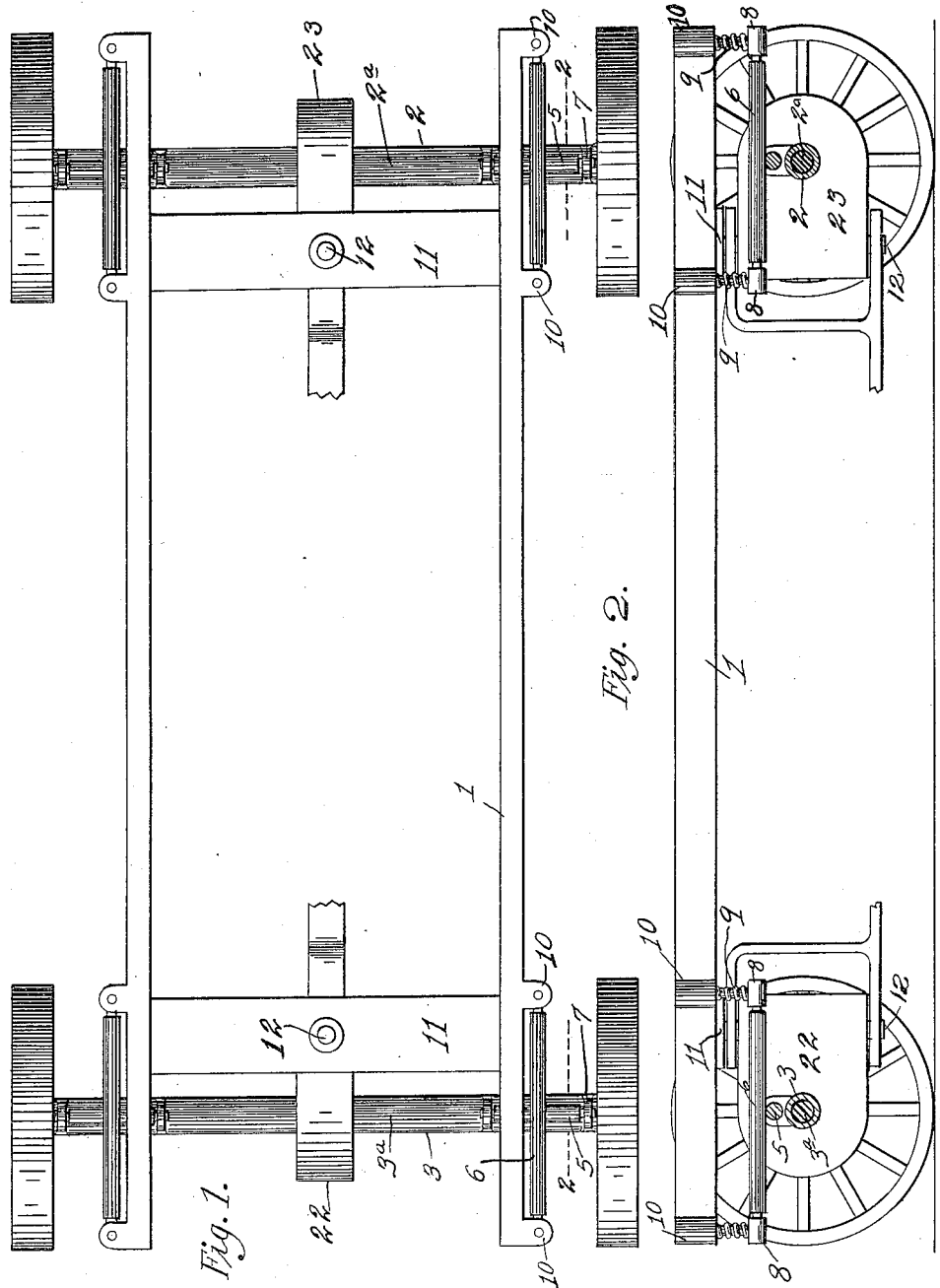

RAFORD W. PETERSON, OF SANTA ROSA, CALIFORNIA.

CROSS-ROLLER SUPPORT.

1,069,719.  Specification of Letters Patent.   Patented Aug. 12, 1913.

Application filed June 17, 1912. Serial No. 704,198.

*To all whom it may concern:*

Be it known that I, RAFORD W. PETERSON, a citizen of the United States, residing at Santa Rosa, county of Sonoma, State of California, have invented certain new and useful Improvements in Cross-Roller Supports, of which the following is a specification.

My invention relates to cross-roller supports and particularly to their use in motor driven vehicles of the type having a four wheel drive and steer and is particularly designed for use in a vehicle having transmission mechanism such as disclosed and claimed in an application filed by me of even date herewith, Serial Number 704,199.

The object of my invention is to provide an anti-friction device as a support for the frames of vehicles.

When it is desired to turn a vehicle various means are applied. I have used as an illustration a vehicle not in common use, namely a four-wheel drive and four-wheel steer, but my device may be applied to any style of vehicle. It will be readily seen that by swinging the axles on their common centers into a position necessary to turn the vehicle to the right or left, there would be more or less movement of said axles at a given point under the side members of the vehicle frame. To carry a load safely said frame must have some bearing upon the axles, and to carry it without damage, it must have proper spring support. To allow the axles to move freely it is necessary to introduce an anti-friction device at the point of this frame support. My device provides these necessary features.

My invention is illustrated in the accompanying drawings, in which:—

Figure 1, is a plan view of the running gear of a vehicle. Fig. 2 is a section taken on line 2—2 of Fig. 1.

Referring by reference charcters to this drawing, 1 designates the frame of the vehicle, 2 and 3 the front and rear tubes or housings in which the axles 2ª and 3ª rotate, these tubes projecting on opposite sides from the gear cases 22 and 23. The axle tubes carry near their outer ends rollers 5, 5 journaled in lugs or bearings 7, 7 and upon these rollers 5, 5 rest the longitudinally disposed rollers 6, 6. These latter rollers are mounted in bearings 8, 8, which have shanks vertically movable in lugs 10, 10 carried by the frame, said shanks being surrounded by springs 9, 9. The gear casings 22 and 23 are pivotally connected to the cross sills 11, 11 of the frame by the shafts 12, 12.

The operation of my invention is as follows: As the axles 2 and 3 are swung on their common centers to turn the vehicle, it will be seen that the rollers 5 and 6 provide an anti-friction bearing between the frame of the vehicle and the axles thus swung. The long rollers 6, 6, attached to the frame would describe an arc whose common center would be the king bolt 12. The friction of their travel in said arc is eliminated by the movement of the rollers 5, 5. The frame rollers 6, 6, being straight and the point of bearing under said rollers describing an arc, by reason of the action of the axle, a lateral motion of the frame is produced relative to said axle and the friction is eliminated by the action of rollers 6, 6. The springs 9, 9, are mounted on the extensions of the bearings 8, 8, and are retained in position by suitable lugs or pockets attached to the frame in which the said extensions are slidably mounted.

I do not limit myself to this particular construction but wish to avail myself of any changes which may come within my invention.

Having thus described my invention, what I claim as new and desire to secure by Letters Patent, is:—

1. In combination a vehicle frame, front and rear axles pivotally connected thereto, rollers parallel with said axles and carried thereby in line with opposite sides of the frame, and longitudinal rollers yieldingly connected with the vehicle frame and resting upon said rollers on the axles, substantially as described.

2. In a cross-roller support and in combination, a vehicle, axles pivotally mounted on common centers, lugs or bearings attached to the outer ends of said axles, rollers movably mounted in said lugs, a frame with cross-sills, lugs or pockets attached to said frame, bearings with extensions engaging said brackets, springs encircling said extension, and rollers mounted in said bearings and resting on the rollers carried by the axles, substantially as described.

3. In a cross-roller support and in combination, a vehicle, axles pivotally mounted on common centers, lugs or bearings attached to the outer ends of said axles, rollers movably mounted in said lugs, a frame with cross-sills, lugs or pockets attached to said frame, springs in said pockets, bearings with extensions slidably mounted in said springs, and rollers suitably mounted in said bearings and contacting with the rollers carried by the axles, substantially as described and claimed.

In testimony whereof, I affix my signature in presence of two witneses.

RAFORD W. PETERSON.

Witnesses:
O. A. EGGERS,
WETH GRANT MURRAY.

Copies of this patent may be obtained for five cents each, by addressing the "Commissioner of Patents, Washington, D. C."